United States Patent
Hirai

(10) Patent No.: US 8,040,407 B2
(45) Date of Patent: Oct. 18, 2011

(54) IMAGE CAPTURING APPARATUS AND IMAGE CAPTURING APPARATUS CONTROL METHOD

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/447,622

(22) PCT Filed: Jan. 21, 2009

(86) PCT No.: PCT/JP2009/051292
§ 371 (c)(1),
(2), (4) Date: Apr. 28, 2009

(87) PCT Pub. No.: WO2009/096396
PCT Pub. Date: Aug. 6, 2009

(65) Prior Publication Data
US 2010/0245621 A1    Sep. 30, 2010

(30) Foreign Application Priority Data

Feb. 1, 2008   (JP) .................................. 2008-023315

(51) Int. Cl.
*H04N 9/64* (2006.01)
(52) U.S. Cl. ...................................................... 348/248
(58) Field of Classification Search .................. 348/248, 348/E3.021, E5.08
See application file for complete search history.

(56) References Cited

U.S. PATENT DOCUMENTS 7,154,552 B1 * 12/2006 Watanabe ..................... 348/362

FOREIGN PATENT DOCUMENTS

| JP | 05-007335 | 1/1993 |
| JP | 06-268922 | 9/1994 |
| JP | 09-181955 | 7/1997 |
| JP | 2004-289559 | 10/2004 |
| JP | 2006-024985 | 1/2006 |

* cited by examiner

*Primary Examiner* — Joseph P Martinez
(74) *Attorney, Agent, or Firm* — Cowan, Liebowitz & Latman, P.C.

(57) ABSTRACT

An image capturing apparatus comprises: an acquisition unit; a smear detection unit; and a smear correction unit which corrects a level of pixels in a smear region in original image data by a first correction amount obtained by multiplying a smear amount by a first coefficient, thereby generating first image data, and corrects the level of pixels in the smear region in the original image data by a second correction amount obtained by multiplying the smear amount by a second coefficient, thereby generating second image data, wherein the first image data is used for at least either of image displaying and image recording, the second image data is used for at least one of exposure control, focus adjustment, and white balance control, and the first coefficient is smaller than the second coefficient.

8 Claims, 8 Drawing Sheets

IMAGE CAPTURING APPARATUS AND IMAGE CAPTURING APPARATUS CONTROL METHOD

TECHNICAL FIELD

The present invention relates to an image capturing apparatus and image capturing apparatus control method.

BACKGROUND ART

It has conventionally been known that a smear phenomenon occurs when a bright object is captured with a pixel array in which a plurality of pixels (photodiodes) are arrayed in the row and column directions, and the captured signal is transferred by a CCD (Charge Coupled Device). More specifically, an unwanted signal component generated by photoelectrically converting light corresponding to a bright object by pixels is mixed in a photoelectrically converted image signal transferred via a vertical transfer path. An image obtained from this image signal contains a vertical white streak, that is, smear region in the column direction of the pixel array (see FIG. 7). The luminance level of pixels in the smear region becomes higher than an actual luminance level.

When the photometry target includes a bright object, an image containing a smear region is obtained, and the exposure value is obtained using the image, underexposure may occur in actual photographing. To prevent this, according to a technique disclosed in Japanese Patent Laid-Open No. 5-007335, the smear amount of pixels in the smear region is detected from a signal obtained by performing idle scanning (scanning before photometry) without reading out any signal from photodiodes before photometry. Then, photometric scanning is done to acquire an image signal (by reading out signals from the photodiodes), and the detected smear amount is subtracted from the image signal, obtaining an image signal in which the smear region is corrected. Then, the exposure value is obtained using the corrected image signal. This can prevent underexposure in actual photographing.

The technique disclosed in Japanese Patent Laid-Open No. 5-007335 requires an extra period for performing scanning before photometry, so the frame period for capturing a 1-frame image may become long. When a moving image for EVF display on the display unit is captured, images which lose the continuity of operation may be obtained.

To prevent this, the smear amount is detected by an OB (Optical Black) portion arranged on the lower side of the pixel array, as shown in FIG. 7. In this case, the smear amount can be detected without setting an extra period for performing scanning before photometry. FIG. 7 shows the pixel array, the OB portion, and an image obtained by them, which are superposed on each other. The OB portion extends in the row direction of the pixel array.

Assume that a bright object stands still. In this case, the signal of a smear component detected in the row direction of the pixel array is extended in the column direction to estimate a corrected region CR1 as a smear region. Smear correction is performed by subtracting the smear amount of the corrected region CR1 as a correction amount from image data generated by capturing the object with the pixel array. At this time, the corrected region CR1 coincides with an actual smear region SR1.

Assume that a bright object moves in the row direction (lateral direction). In this case, as disclosed in Japanese Patent Laid-Open No. 6-268922, the smear region extends obliquely in an image obtained by capturing the object (see FIG. 8). The signal of a smear component detected in the row direction of the pixel array is extended in the column direction to estimate a corrected region CR2 as a smear region. Smear correction is performed by subtracting the smear amount of the corrected region CR2 as a correction amount from image data generated by capturing the object with the pixel array. At this time, the corrected region CR2 is shifted from an actual smear region SR2. In the corrected region CR2 and smear region SR2, only overlapping regions SR2a and CR2a are properly corrected, generating a false corrected region CR2b and uncorrected region SR2b. The luminance level of the false corrected region CR2b is lower than that of peripheral pixels by the correction amount.

As described above, when smear correction is done for image data generated by capturing a moving bright object, an image containing a black streak in the vertical direction is obtained. The contrast of the black streak with peripheral pixels is high, degrading the quality of an image to view.

The black streak can be made less conspicuous in the image by setting the correction amount to less than 100% (e.g., 50%) of the smear amount of the corrected region CR2. However, the smear component still remains. Thus, if control operations such as exposure control, focus adjustment, and white balance control are executed using this corrected image data, the precision of the control operations may decrease.

For example, when the exposure value is obtained using smear component-containing image data, underexposure may occur in actual photographing.

For example, when the focus state is detected using smear component-containing image data, the focus may be adjusted to a position where not the contrast of the object but that of the edge of the smear amount is maximized.

DISCLOSURE OF INVENTION

It is an aim of the present invention to suppress degradation of the quality of an image to view and suppress a decrease in the precision of a control operation using image data even when a moving bright object is captured.

According to the first aspect of the present invention, there is provided an image capturing apparatus comprising: an acquisition unit which acquires original image data containing an image of an object; a smear detection unit which detects, from the original image data, a smear region where a smear is generated, and which detects a smear amount of pixels in the smear region; and a smear correction unit which corrects a level of pixels in the smear region in the original image data by a first correction amount obtained by multiplying the smear amount by a first coefficient, thereby generating first image data, and corrects the level of pixels in the smear region in the original image data by a second correction amount obtained by multiplying the smear amount by a second coefficient, thereby generating second image data, wherein the first image data is used for at least either of image displaying and image recording, the second image data is used for at least one of exposure control, focus adjustment, and white balance control, and the first coefficient is smaller than the second coefficient.

According to the second aspect of the present invention, there is provided an image capturing apparatus control method comprising: an acquisition step of acquiring original image data containing an image of an object; a smear detection step of detecting, from the original image data, a smear region where a smear is generated, and a smear amount of pixels in the smear region; and a smear correction step of correcting a level of pixels in the smear region in the original image data by a first correction amount obtained by multiplying the smear amount by a first coefficient, thereby generating first image data, and correcting the level of pixels in the smear region in the original image data by a second correction amount obtained by multiplying the smear amount by a second coefficient, thereby generating second image data, wherein the first image data is used for at least either of image displaying and image recording, the second image data is used for at least one of exposure control, focus adjustment, and white balance control, and the first coefficient is smaller than the second coefficient.

The present invention can suppress degradation of the quality of an image to view and can suppress a decrease in the precision of a control operation using image data even when a moving bright object is captured.

Further features of the present invention will become apparent from the following description of exemplary embodiments with reference to the attached drawings.

BEST MODE FOR CARRYING OUT THE INVENTION

Figure 1:
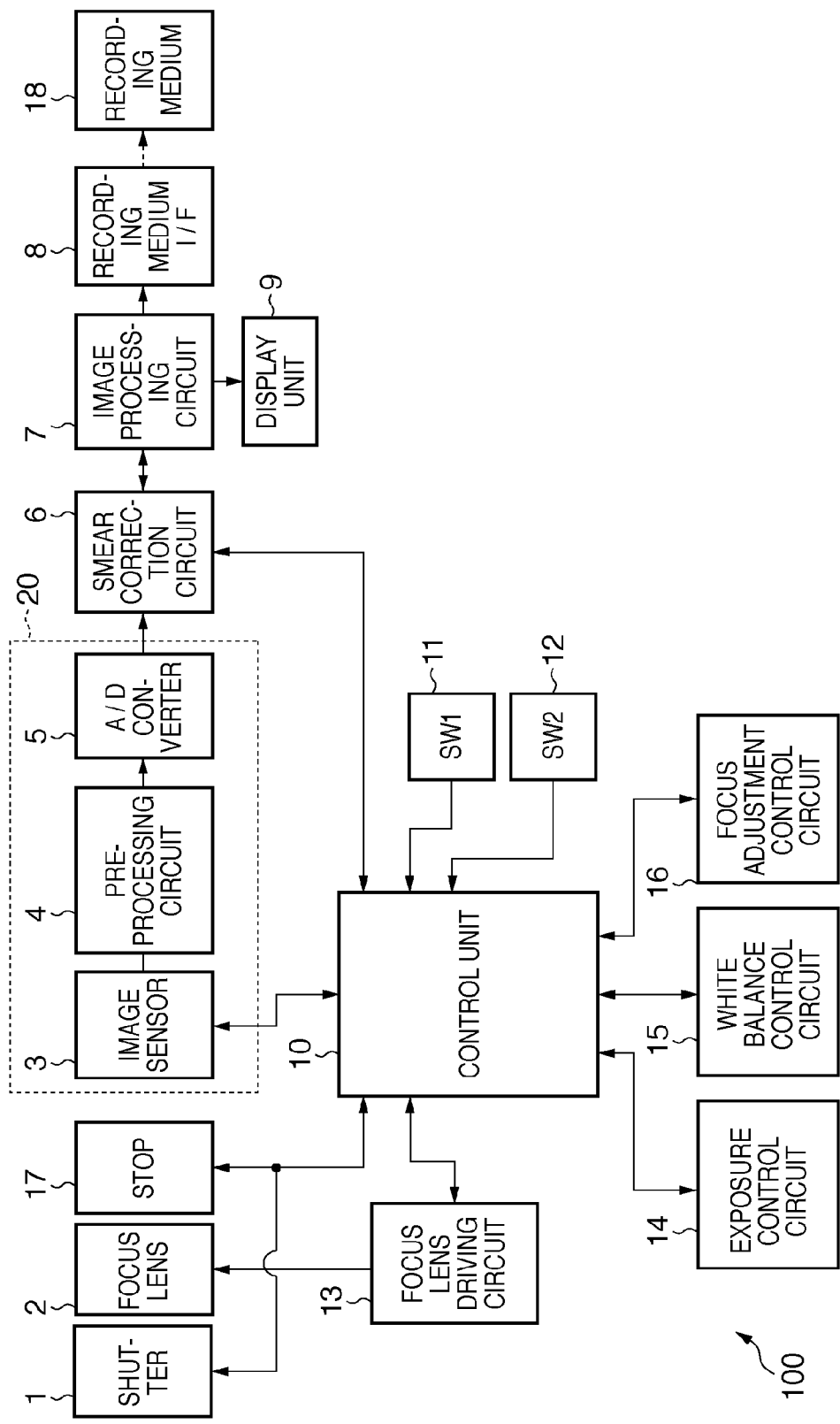
FIG. 1 is a block diagram showing the schematic arrangement of an image capturing apparatus 100 according to an embodiment of the present invention.

An image capturing apparatus 100 according to an embodiment of the present invention will be explained with reference to FIG. 1. FIG. 1 is a block diagram showing the schematic arrangement of the image capturing apparatus 100 according to the embodiment of the present invention.

The image capturing apparatus 100 is, for example, a digital camera. The image capturing apparatus 100 includes a shutter 1, focus lens (photographing optical system) 2, stop 17, acquisition unit 20, smear correction circuit 6, image processing circuit 7, display unit 9, and recording medium interface 8. The focus lens 2 is one of lenses which form a lens unit (not shown). The shutter 1, focus lens 2, and stop 17 form the photographing optical system. The image capturing apparatus 100 also includes a control unit 10, first switch (SW1) 11, second switch (SW2) 12, exposure control circuit 14, white balance control circuit 15, focus adjustment control circuit 16, and focus lens driving circuit 13.

The shutter 1 is arranged in front of the focus lens 2 on the optical path to control the exposure.

The lens unit including the focus lens 2 refracts incident light to form an object image on the image sensing plane of an image sensor 3.

The stop 17 is interposed between the focus lens 2 and the image sensor 3 on the optical path. The stop 17 adjusts the quantity of light guided to the image sensor 3 after passing through the focus lens 2.

The acquisition unit 20 acquires original image data containing an object image. The acquisition unit 20 includes the image sensor 3, a pre-processing circuit 4, and an A/D converter 5.

The image sensor 3 converts an object image formed on the image sensing plane (pixel array) into an image signal (analog signal). On the pixel array, a plurality of pixels is arrayed in the row and column directions. An OB portion which is shielded from light and acquires a black-level reference signal is arranged on the lower side of the pixel array. The image sensor 3 reads out and outputs image signals from the pixel array and OB portion.

The pre-processing circuit 4 is connected to the image sensor 3, and processes an image signal output from the image sensor 3. For example, the pre-processing circuit 4 performs CDS processing for an image signal to remove a noise component, or applies a gain to the image signal.

The A/D converter 5 is connected to the pre-processing circuit 4, and converts a processed image signal (analog signal) output from the pre-processing circuit 4 into original image data (digital signal).

The smear correction circuit 6 is connected to the A/D converter 5, and performs smear detection processing and smear correction processing for the original image data output from the A/D converter 5. The smear correction circuit 6 includes a smear detection unit 6a and smear correction unit 6b (see FIG. 2).

The smear detection unit 6a detects, from the original image data, a smear region where a smear is generated, and the smear amount of pixels in the smear region.

The smear correction unit 6b generates the first image data by correcting the level of pixels in the smear region in the original image data by the first correction amount obtained by multiplying the smear amount by the first coefficient. The first image data is used for at least either of image displaying and image recording.

The smear correction unit 6b generates the second image data by correcting the level of pixels in the smear region in the original image data by the second correction amount obtained by multiplying the smear amount by the second coefficient. The second image data is used for at least one of exposure control, focus adjustment, and white balance control. The first coefficient is smaller than the second coefficient.

The smear correction unit 6b supplies the first image data to the image processing circuit 7, and the second image data to the control unit 10. In this way, the smear correction unit 6b parallel-executes processing to generate the first image data in a first correction circuit 23 (see FIG. 2: to be described later) and processing to generate the second image data in a second correction circuit 24 (see FIG. 2: to be described later).

Figure 2:
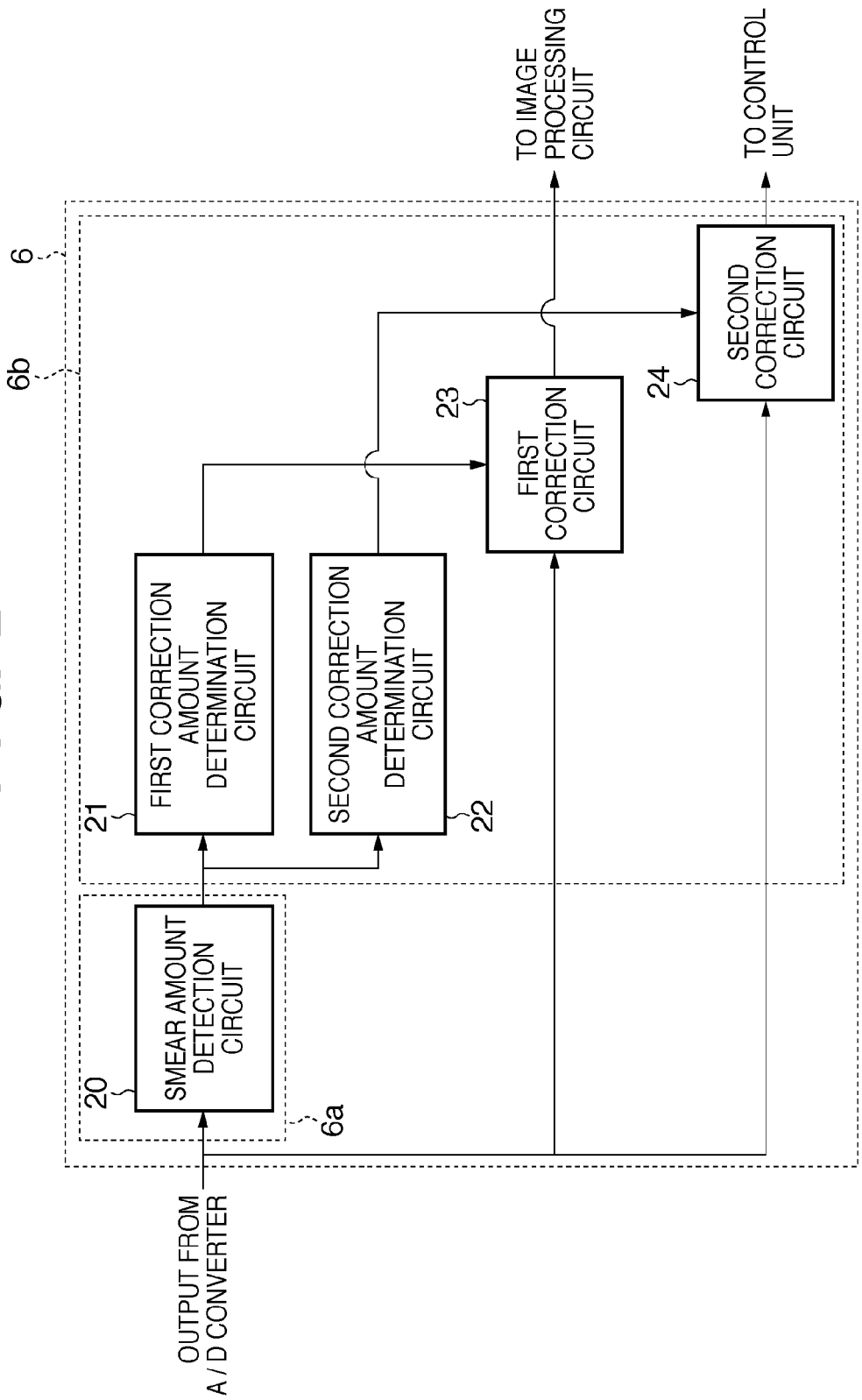
FIG. 2 is a block diagram showing the detailed arrangement of a smear correction circuit 6.

In the embodiment, two correction circuits are arranged (see FIG. 2). However, correction circuits may also be prepared separately for exposure control, focus adjustment, and white balance control. One correction circuit may also switch a signal to be corrected in time series to alternately perform display smear correction and control smear correction. In other words, the smear correction unit of the smear correction circuit 6 may also sequentially execute, at different timings, processing to generate the first image data and processing to generate the second image data.

The image processing circuit 7 is connected to the smear correction circuit 6, and converts the first image data output from the smear correction circuit 6 into an image display or image recording signal. More specifically, the image processing circuit 7 converts the first image data (digital signal) into an image display analog signal, and supplies the converted analog signal to the display unit 9. The image processing circuit 7 converts the first image data into compressed image data by encoding or the like, and supplies the converted compressed image data to the recording medium interface 8.

The display unit 9 is connected to the image processing circuit 7, and displays an image corresponding to the image display analog signal output from the image processing circuit 7.

A recording medium 18 is detachably connected to the recording medium interface 8. The compressed image data output from the image processing circuit 7 is recorded on the recording medium 18 via the recording medium interface 8.

The control unit 10 controls the overall image capturing apparatus 100. For example, the control unit 10 receives the second image data from the smear correction circuit 6. In accordance with the ON state of the first switch (SW1) 11, the control unit 10 supplies the second image data to the exposure control circuit 14, white balance control circuit 15, and focus adjustment control circuit 16. Then, the exposure control circuit 14, white balance control circuit 15, and focus adjustment control circuit 16 perform a control operation using the second image data in cooperation with the control unit 10, respectively.

A shutter button (not shown) accepts an instruction (shooting instruction) or the like from the user to shoot a still image. For example, when pressed halfway, the shutter button accepts the first instruction to perform AF (Auto Focus) processing, AE (Auto Exposure) processing, AWB (Auto White Balance) processing, EF (Electronic Flash pre-emission) processing, or the like. For example, when pressed fully, a shutter button accepts the second instruction to perform still image shooting or the like.

The first switch (SW1) 11 is turned on upon receiving the first instruction from the shutter button, and supplies information representing the ON state to the control unit 10. In accordance with the ON state of the first switch 11, the control unit 10 instructs each unit to start an operation such as AF (Auto Focus) processing, AE (Auto Exposure) processing, AWB (Auto White Balance) processing, or EF (Electronic Flash pre-emission) processing.

The second switch (SW2) 12 is turned on upon receiving the second instruction from the shutter button, and supplies information representing its ON state to the control unit 10. Then, the control unit 10 instructs each unit to start a series of shooting processes. In the series of shooting processes, exposure processing is performed to write a signal read out from the image sensor 3 as image data in a memory (not shown) via the A/D converter 5 and smear correction circuit 6, and development processing is performed using calculation by the image processing circuit 7. In the series of shooting processes, recording processing is done to read out image data from a memory (not shown), compress it by the recording medium interface 8, and write the compressed image data on the recording medium 18.

The exposure control circuit 14 receives an AE processing instruction and the second image data from the control unit 10, and executes an AE processing control operation in cooperation with the control unit 10. The exposure control circuit 14 includes a luminance detection unit and exposure control unit. The luminance detection unit detects the luminance of a luminance detection region BDA (see FIG. 3) serving as part of an image corresponding to the second image data. The exposure control unit obtains a proper exposure value of the image sensor 3 on the basis of the luminance detected by the luminance detection unit. That is, the exposure control unit controls the shutter 1 and stop 17 via the control unit 10 to obtain a proper exposure value. In this manner, the exposure control circuit 14 controls the exposure value of the image sensor 3.

Figure 3:
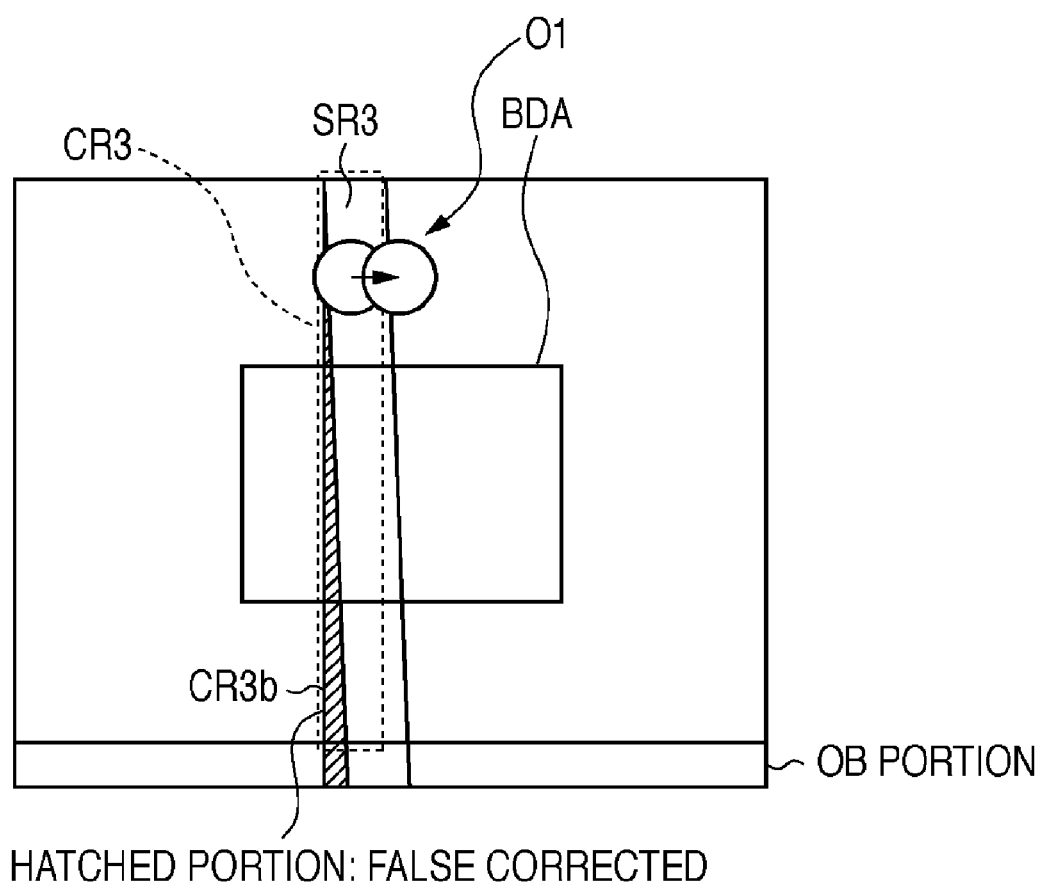
FIG. 3 is a view showing a luminance detection region.

As shown in FIG. 3, the luminance detection unit of the exposure control circuit 14 detects the luminance of the luminance detection region BDA which intersects a corrected region CR3 and smear region SR3 in an image corresponding to the second image data. The lateral width of a region (luminance detection region) for integrating a luminance level for calculating an exposure value is set to be wider than each width of a smear generation region (smear region) and a false corrected region. Since an area where a smear is generated equals an area for correcting a smear component, a luminance level from which the smear component is properly subtracted can be obtained as an integration result.

The white balance control circuit 15 receives an AWB processing instruction and the second image data from the control unit 10, and executes an AWB processing control operation in cooperation with the control unit 10.

As for smear correction of an image used to detect a white balance coefficient, the white balance coefficient can be more accurately obtained from an image from which the smear component is completely removed. Thus, similar to an image used to obtain an exposure, the smear can be completely corrected. The white balance coefficient suffices to be obtained by a known method.

The focus adjustment control circuit 16 receives an AF processing instruction and the second image data from the control unit 10, and executes an AF processing control operation in cooperation with the control unit 10. The focus adjustment control circuit 16 includes a focus detection unit and focusing unit. The focus detection unit detects the focus state of an object in a focus detection region (e.g., an AF frame FDA1 shown in FIG. 5) serving as part of an image corresponding to the second image data. The focusing unit controls the focus lens 2 via the control unit 10 and focus lens driving circuit 13 in accordance with the object focus state detected by the focus detection unit.

Under the control of the focusing unit of the focus adjustment control circuit 16, the focus lens driving circuit 13 controls the focus lens 2 to a position where the contrast of the edge of the object in the focus detection region is maximized.

The detailed arrangement of the smear correction circuit 6 will be explained with reference to FIG. 2. FIG. 2 is a block diagram showing the detailed arrangement of the smear correction circuit 6.

As described above, the smear correction circuit 6 includes the smear detection unit 6a and smear correction unit 6b. The smear detection unit 6a includes a smear amount detection circuit 20. The smear correction unit 6b includes a first correction amount determination circuit 21, a second correction amount determination circuit 22, the first correction circuit (subtraction process unit) 23, and the second correction circuit (subtraction process unit) 24.

The smear amount detection circuit 20 detects a smear region from original image data output from the A/D converter 5, and detects the smear amount of the smear region.

More specifically, as shown in FIG. 3, the smear amount detection circuit 20 detects, for each column, the luminance level of original image data acquired by the OB portion of the image sensor 3. When pixels of a predetermined luminance level or higher continue by a predetermined number or more of columns, the smear amount detection circuit 20 detects the region as the columns of the smear region. More specifically, the smear amount detection circuit 20 detects a smear amount by the OB portion extending in the row direction of the pixel array. Then, the smear amount detection circuit 20 extends, in the column direction, the signal of a smear component detected in the row direction of the pixel array, thereby estimating the corrected region CR3 as the smear region SR3. The smear amount detection circuit 20 calculates the difference between the signal amount of pixels in the corrected region CR3 and that of pixels around the corrected region CR3, thereby detecting the smear amount of pixels in the corrected region CR3. When a moving bright object is captured, the corrected region CR3 is shifted from the smear region SR3.

The first correction amount determination circuit 21 is connected to the smear amount detection circuit 20, and receives original image data and the smear amount from the smear amount detection circuit 20. The first correction amount determination circuit 21 obtains the first correction amount by multiplying the smear amount by the first coefficient.

For example, letting S(i) (i is a horizontal coordinate position) be a smear amount output from the smear amount detection circuit 20, the first correction amount determination circuit 21 multiplies the smear amount by a first coefficient k1 to determine a first correction amount S1(i):

$$S1(i)=k1\times S(i) \qquad (1)$$

When k1=0.5 (i.e., 50%), the correction amount becomes half the detected smear amount.

The second correction amount determination circuit 22 is connected to the smear amount detection circuit 20, and receives original image data and the smear amount from the smear amount detection circuit 20. The second correction amount determination circuit 22 obtains the second correction amount by multiplying the smear amount by the second coefficient.

For example, letting S(i) (i is a horizontal coordinate position) be a smear amount output from the smear amount detection circuit 20, the second correction amount determination circuit 22 multiplies the smear amount by a second coefficient k2 to determine a second correction amount S2(i):

$$S2(i)=k2\times S(i) \qquad (2)$$

When k2=1.0 (i.e., 100%), the correction amount equals the detected smear amount.

The first correction circuit 23 receives the original image data and the first correction amount from the first correction amount determination circuit 21. The first correction circuit 23 generates the first image data by correcting the level of pixels in the smear region in the original image data by the first correction amount. That is, the first correction circuit 23 generates the first image data by subtracting the first correction amount from the smear region in the original image data. The first correction circuit 23 supplies the first image data to the image processing circuit 7.

For example, the first correction circuit 23 subtracts the first correction amount from the pixel value of each column using S1(i) (see equation (1)). Letting A(i,j) (j is a vertical coordinate position) be a pixel value, a corrected pixel value B1(i,j) serving as the first image data is $$B1(i,j)=A(i,j)-S1(i) \qquad (3)$$

The second correction circuit 24 receives the original image data and the second correction amount from the second correction amount determination circuit 22. The second correction circuit 24 generates the second image data by correcting the level of pixels in the smear region in the original image data by the second correction amount. That is, the second correction circuit 24 generates the second image data by subtracting the second correction amount from the smear region in the original image data. The second correction circuit 24 supplies the second image data to the control unit 10.

For example, the second correction circuit 24 subtracts the correction amount from the pixel value of each column using S2(i) (see equation (2)). Letting A(i,j) (j is a vertical coordinate position) be a pixel value, a corrected pixel value B2(i,j) serving as the second image data is $$B2(i,j)=A(i,j)-S2(i) \qquad (4)$$

As described above, when smear correction is executed for image data acquired by capturing a moving bright object O1, a false corrected region CR3b is generated as shown in FIG. 3. Even in this case, the first image data is used as an image display or image recording signal, so the contrast of the false corrected region CR3b can be decreased with respect to that of peripheral pixels. The false corrected region CR3b can be made less conspicuous in a displayed or recorded image, suppressing degradation of the quality of an image to view. The second image data is used as a signal for exposure control, focus adjustment, and white balance control, that is, the control operation is executed using the second image data. The control operation can be done using smear component-removed image data, suppressing a decrease in the precision of the control operation using image data.

From this, even when a moving bright object is captured, degradation of the quality of an image to view, and a decrease in the precision of a control operation using image data can be suppressed.

When the smear detection unit of the smear correction circuit 6 detects the smear region SR3, the luminance detection unit of the exposure control circuit 14 may also change the lateral width of the luminance detection region BDA to be wider. The luminance detection unit of the exposure control circuit 14 may also change the lateral width of the luminance detection region BDA in accordance with the width of the smear region SR3 (corrected region CR3).

Figure 4:
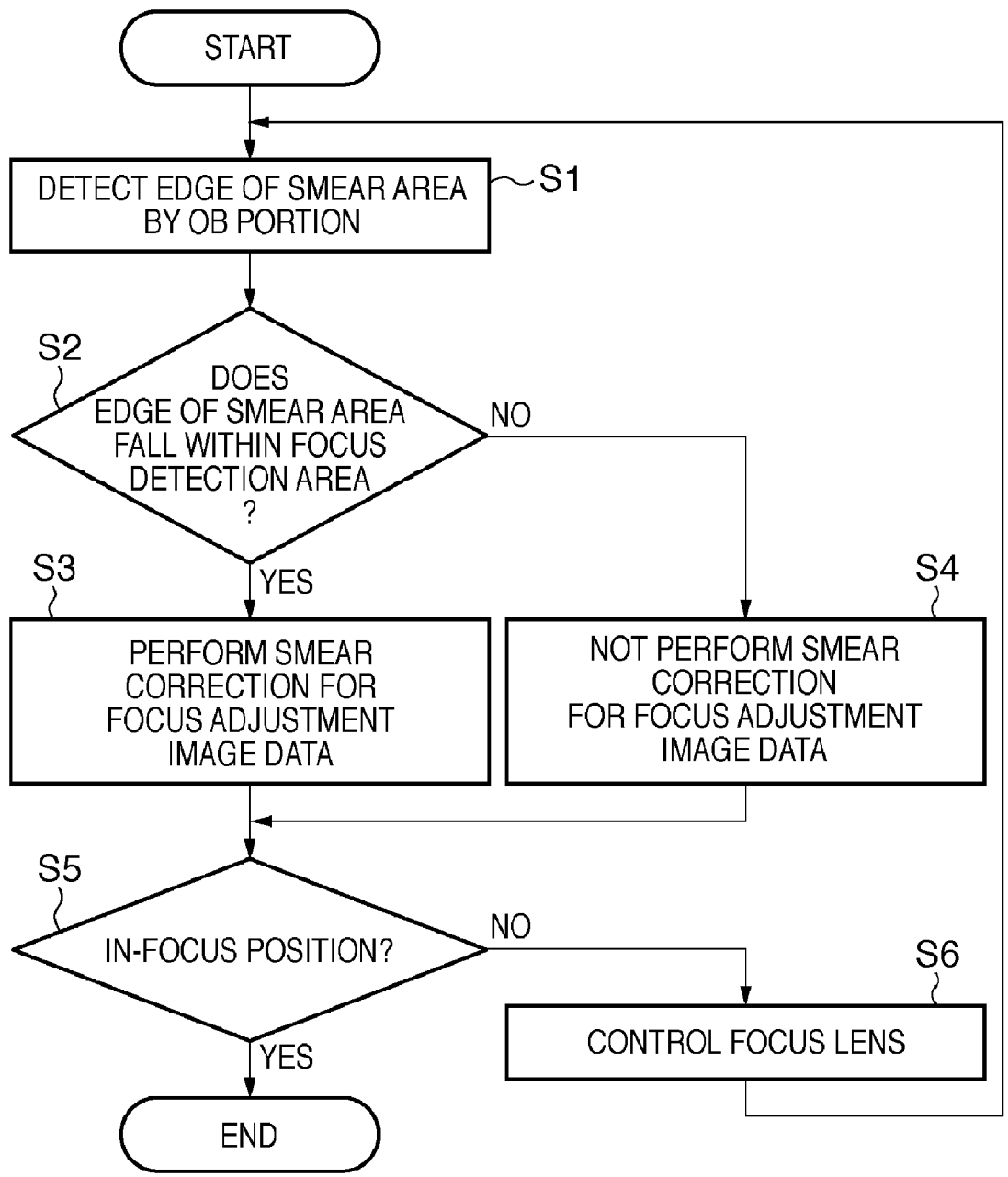
FIG. 4 is a flowchart showing an example of the operation of the image capturing apparatus 100.
Figure 5:
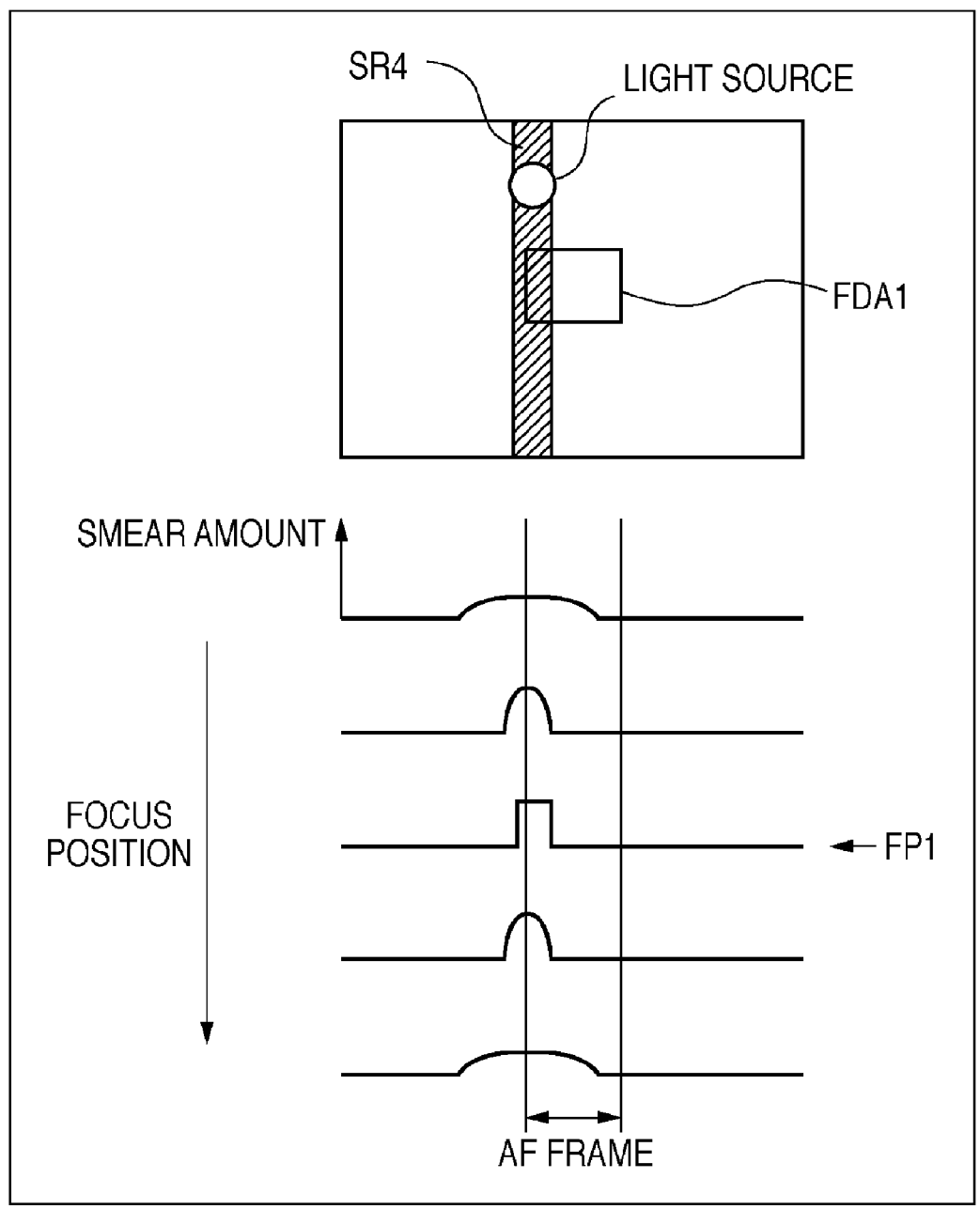
FIG. 5 is a view showing a focus detection region.

The image capturing apparatus 100 may also change processing to generate the second image data in accordance with the positional relationship between the edge of the smear region and the focus detection region (e.g., the AF frame FDA1 shown in FIG. 5). In other words, the image capturing apparatus 100 may also perform processing shown in FIG. 4. FIG. 4 is a flowchart showing an example of the operation of the image capturing apparatus 100.

In step S1, the smear detection unit 6a of the smear correction circuit 6 detects the edge of the smear region in an object image by using a bandpass filter or the like. The smear detection unit 6a supplies, to the smear correction unit, information on the edge of the smear region.

In step S2, the smear correction unit 6b of the smear correction circuit 6 receives, from the smear detection unit 6a, the information on the edge of the smear region. The smear correction unit 6b receives, from the focus detection unit of the focus adjustment control circuit 16 via the control unit 10, information on the pixel position of the focus detection region. The smear correction unit 6b determines whether the edge of the smear region falls within the focus detection region.

For example, when a smear region SR4 and the focus detection region (AF frame) FDA1 have a positional relationship as shown in FIG. 5 in the object image, the smear correction unit 6b determines that the edge of the smear region falls within the focus detection region. If the focus detection unit of the focus adjustment control circuit 16 detects the focus state of the object in the focus detection region FDA1, the focus may be adjusted to a position FP1 where not the contrast of the object but that of the edge of the smear region is maximized.

Figure 6:
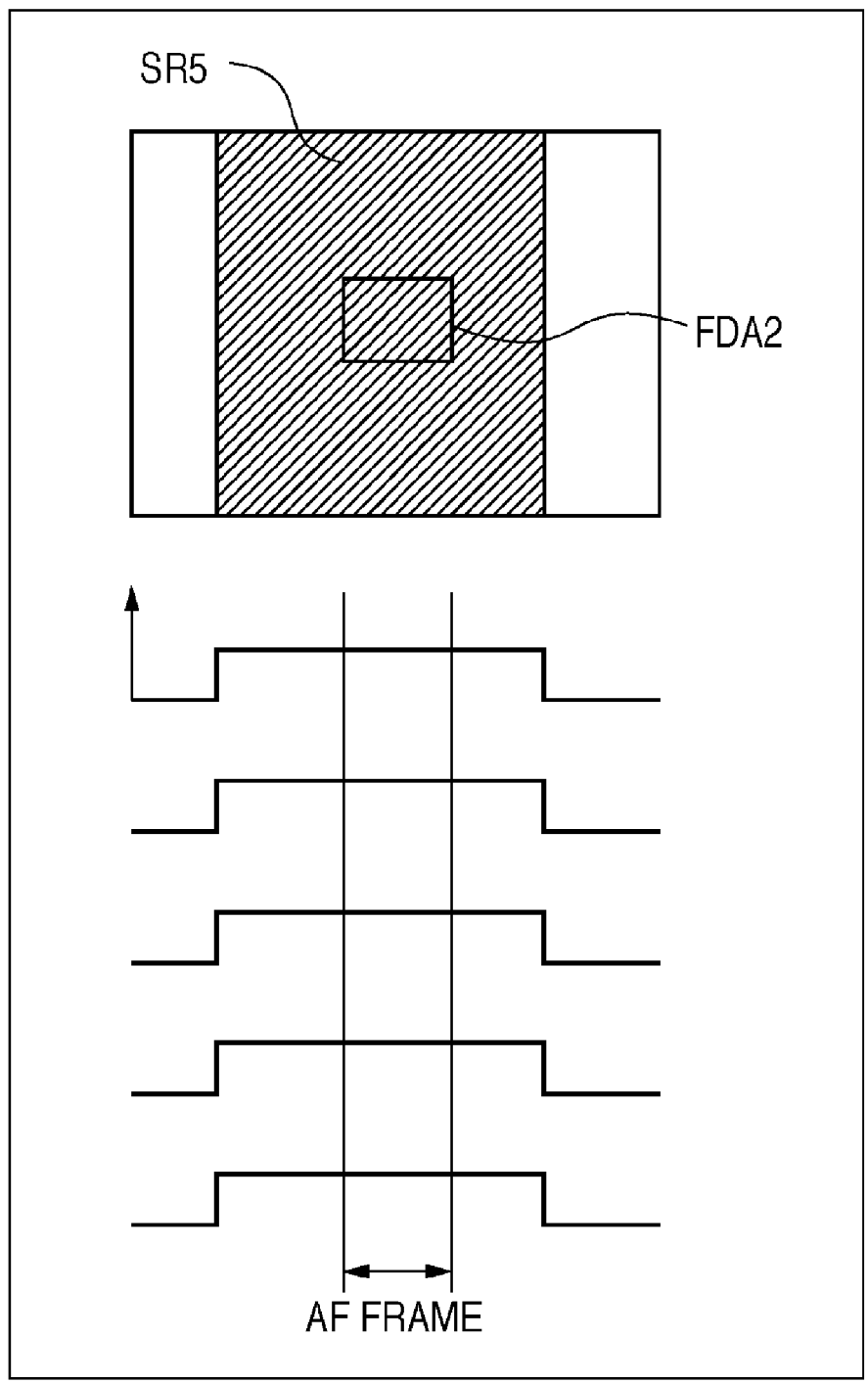
FIG. 6 is a view showing a focus detection region.
Figure 7:
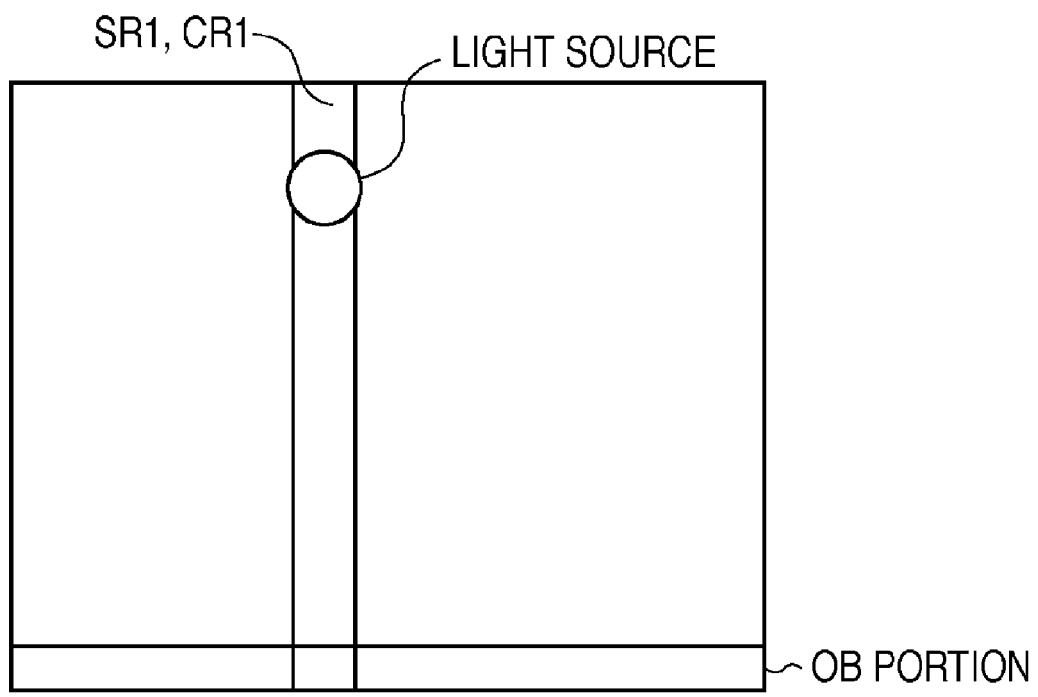
FIG. 7 is a view for explaining a problem to be solved by the present invention.
Figure 8:
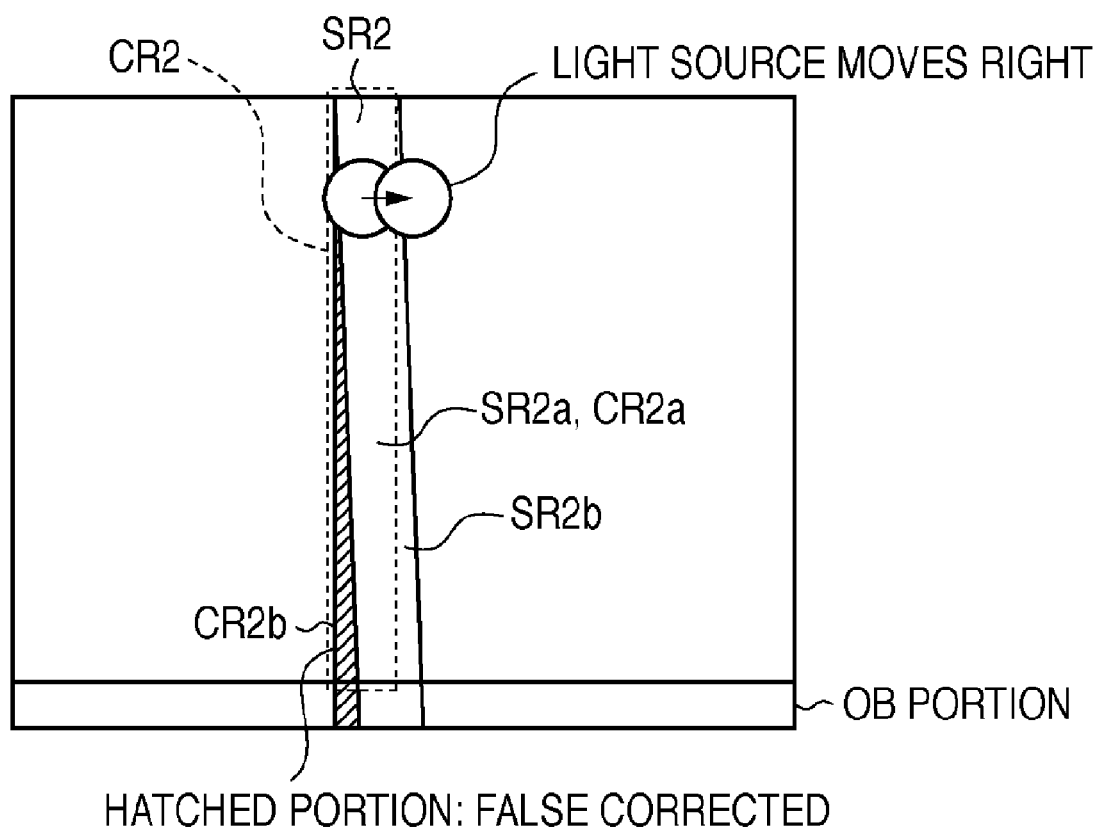
FIG. 8 is a view for explaining a problem to be solved by the present invention.

For example, when a smear region SR5 and a focus detection region (AF frame) FDA2 have a positional relationship as shown in FIG. 6 in the object image, the smear correction unit 6b determines that the edge of the smear region does not fall within the focus detection region. Even if the focus detection unit of the focus adjustment control circuit 16 detects the focus state of the object in the focus detection region FDA2, there is low possibility that the focus may be adjusted to a position where not the contrast of the object but that of the edge of the smear region is maximized. Subtracting a smear from an image may decrease the S/N ratio of the image. In this case, it is desirable not to perform smear correction.

If the smear correction unit 6b determines that the edge of the smear region falls within the focus detection region (YES in S2), the process advances to step S3. If the smear correction unit 6b determines that the edge of the smear region does not fall within the focus detection region (NO in S2), the process advances to step S4.

In step S3, the smear correction unit 6b of the smear correction circuit 6 generates the second image data by correcting the level of pixels in the smear region in the original image data by the second correction amount. In other words, the smear correction unit 6b performs smear correction for the second image data used for focus adjustment. The smear correction unit 6b supplies the second image data to the control unit 10.

In step S4, the smear correction unit 6b of the smear correction circuit 6 sets the original image data as the second image data without correcting the level of pixels in the smear region in original image data by the second correction amount. In other words, the smear correction unit 6b does not execute smear correction for the second image data used for focus adjustment. The smear correction unit 6b supplies the second image data to the control unit 10.

In step S5, the focus detection unit of the focus adjustment control circuit 16 detects the focus state of the object in the focus detection region (e.g., the focus detection region FDA1 shown in FIG. 5 or the focus detection region FDA2 shown in FIG. 6) serving as part of an image corresponding to the second image data. While referring to the past detection log, the focus detection unit determines whether the position of the focus lens 2 is adjusted to the in-focus position where the contrast of the edge of the object is maximized. If the focus detection unit determines that the position of the focus lens 2 is adjusted to the in-focus position, the process ends. If the focus detection unit determines that the position of the focus lens 2 is not adjusted to the in-focus position, the process advances to step S6.

In step S6, the focusing unit of the focus adjustment control circuit 16 controls to drive the focus lens 2 via the control unit 10 and focus lens driving circuit 13 in accordance with the object focus state detected by the focus detection unit.

The smear correction circuit 6 of the image capturing apparatus 100 may further include a motion detection unit. In this case, the acquisition unit 20 acquires a plurality of original image data containing an object image. The motion detection unit receives the plurality of original image data from the acquisition unit 20, and compares them to detect the motion of the object. The smear correction unit 6b receives the detection result information from the motion detection unit.

When the motion of the object is detected (e.g. the moving amount of the object is determined to be larger than the threshold) by the motion detection unit, the smear correction unit 6b generates the first image data by correcting the level of pixels in the smear region in the original image data by the first correction amount obtained by multiplying the smear amount by the first coefficient. Also, the smear correction unit 6b generates the second image data by correcting the level of pixels in the smear region in the original image data by the second correction amount obtained by multiplying the smear amount by the second coefficient.

When no motion of the object is detected (e.g. the moving amount of the object is determined to be smaller than the threshold) by the motion detection unit, the smear correction unit 6b generates the first image data and second image data by correcting the level of pixels in the smear region in original image data by the second correction amount.

More specifically, when the motion of the object is detected by the motion detection unit, the smear correction unit 6b generates the first image data by subtracting the first correction amount from the smear region in the original image data. The smear correction unit 6b generates the second image data by subtracting the second correction amount from the smear region in the original image data.

When no motion of the object is detected by the motion detection unit, the smear correction unit 6b generates the first image data and second image data by subtracting the second correction amount from the smear region in the original image data.

In this manner, when a bright object stands still and no false corrected region CR3b is generated, smear component-removed image data is used for image displaying or image recording. Thus, the quality of an image to view can improve.

The luminance detection unit of the exposure control circuit 14 may also change the size of the luminance detection region BDA in accordance with the moving amount of the object detected by the motion detection unit. For example, the luminance detection region BDA may also be determined to contain both the positions of a bright object before and after movement.

When the motion detection unit detects the motion of an object, the luminance detection unit of the exposure control circuit 14 may also change the size of the luminance detection region BDA in accordance with the moving amount of the object. For example, the luminance detection unit receives moving amount information of the object from the motion detection unit, and increases each side of the luminance detection region BDA by a size corresponding to the moving amount of the object. Hence, the size of an region (luminance detection region) for integrating a luminance level for calculating an exposure value can be easily set to be wider than each width of the smear generation region (smear region) and the false corrected region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-023315, filed Feb. 1, 2008 which is hereby incorporated by reference herein in its entirety.

The invention claimed is:

1. An image capturing apparatus comprising:
    an acquisition unit which acquires original image data containing an image of an object;
    a smear detection unit which detects, from the original image data, a smear region where a smear is generated, and which detects a smear amount of pixels in the smear region; and
    a smear correction unit which corrects a level of pixels in the smear region in the original image data by a first correction amount obtained by multiplying the smear amount by a first coefficient, thereby generating first image data, and corrects the level of pixels in the smear region in the original image data by a second correction amount obtained by multiplying the smear amount by a second coefficient, thereby generating second image data, wherein the first image data is used for at least either of image displaying and image recording, the second image data is used for at least one of exposure control, focus adjustment, and white balance control, and the first coefficient is smaller than the second coefficient.

2. The apparatus according to claim 1, wherein the smear correction unit includes a subtraction process unit which subtracts a correction amount from the original image data acquired by the acquisition unit, thereby correcting the level of pixels, and the subtraction process unit subtracts the first correction amount from the smear amount in the original image data, thereby generating the first image data, and subtracts the second correction amount from the smear region in the original image data, thereby generating the second image data.

3. The apparatus according to claim 1, further comprising:

a luminance detection unit which detects a luminance of a luminance detection region which is part of an image corresponding by the second image data; and an exposure control unit which controls an exposure value of the acquisition unit on the basis of the luminance detected by the luminance detection unit, wherein when the smear detection unit detects the smear region, the luminance detection unit detects the luminance of the luminance detection region which intersects the smear region in the image corresponding to the second image data.

4. The apparatus according to claim 1, further comprising:

a photographing optical system which forms an image on an image sensing plane of the acquisition unit;

a focus detection unit which detects a focus state of the object in a focus detection region which is part of an image corresponding to the second image data; and a focusing unit which controls the photographing optical system in accordance with the focus state of the object detected by the focus detection unit, wherein the smear detection unit detects an edge of the smear region in the image of the object, and when the edge of the smear region detected by the smear detection unit falls within the focus detection region, the smear correction unit corrects the level of pixels in the smear region in the original image data by the second correction amount, thereby generating the second image data, and when the edge of the smear region detected by the smear detection unit does not fall within the focus detection region, the smear correction unit sets the original image data as the second image data without correcting the level of pixels in the smear region in the original image data by the second correction amount.

5. The apparatus according to claim 1, further comprising a motion detection unit which detects a motion of the object, wherein the acquisition unit acquires a plurality of original image data including an image of the object, the motion detection unit compares the plurality of original image data to detect the motion of the object, and when the motion of the object is detected by the motion detection unit, the smear correction unit corrects the level of pixels in the smear region in the original image data by the first correction amount obtained by multiplying the smear amount by the first coefficient, thereby generating the first image data, and corrects the level of pixels in the smear region in the original image data by the second correction amount obtained by multiplying the smear amount by the second coefficient, thereby generating second image data, and when no motion of the object is detected by the motion detection unit, the smear correction unit corrects the level of pixels in the smear region in the original image data by the second correction amount, thereby generating the first image data and the second image data.

6. The apparatus according to claim 5, wherein the smear correction unit includes a subtraction process unit which subtracts a correction amount from the original image data acquired by the acquisition unit, thereby correcting the level of pixels, and when the motion of the object is detected by the motion detection unit, the subtraction process unit subtracts the first correction amount from the smear amount in the original image data, thereby generating the first image data, and subtracts the second correction amount from the smear region in the original image data, thereby generating the second image data, and when no motion of the object is detected by the motion detection unit, the subtraction process unit subtracts the second correction amount from the smear amount in the original image data, thereby generating the first image data and the second image data.

7. The apparatus according to claim 6, further comprising:

a luminance detection unit which detects a luminance of a luminance detection region which is part of an image corresponding to the second image data; and an exposure control unit which controls an exposure value of the acquisition unit on the basis of the luminance detected by the luminance detection unit, wherein when the smear detection unit detects the smear region and the motion detection unit detects the motion of the object, the luminance detection unit detects the luminance of the luminance detection region which intersects an region from which the subtraction process unit subtracts the correction amount, and the smear region in the image corresponding to the second image data.

8. An image capturing apparatus control method comprising:

an acquisition step of acquiring original image data containing an image of an object;

a smear detection step of detecting, from the original image data, a smear region where a smear is generated, and a smear amount of pixels in the smear region; and a smear correction step of correcting a level of pixels in the smear region in the original image data by a first correction amount obtained by multiplying the smear amount by a first coefficient, thereby generating first image data, and correcting the level of pixels in the smear region in the original image data by a second correction amount obtained by multiplying the smear amount by a second coefficient, thereby generating second image data, wherein the first image data is used for at least either of image displaying and image recording, the second image data is used for at least one of exposure control, focus adjustment, and white balance control, and the first coefficient is smaller than the second coefficient.

* * * * *